United States Patent Office 3,506,455
Patented Apr. 14, 1970

3,506,455
PROCESS OF IMPREGNATING MEAT
Jack Palmer Savage, Biddenham, and Raymond Chenneour, Sharnbrook, England, assignors to Unilever Limited, Birkenhead, England, a company of Great Britain
No Drawing. Continuation-in-part of application Ser. No. 385,046, July 24, 1964. This application Oct. 9, 1967, Ser. No. 673,955
Int. Cl. A23l 1/31, 1/315, 1/325
U.S. Cl. 99—107
4 Claims

ABSTRACT OF THE DISCLOSURE

Impregnation of raw meat with uncooked starch grains by injection. The starch binds the meat fluids produced on cooking.

The loss of fluids from meat during cooking is reduced by impregnating the meat with a starch having the capacity to bind meat fluids.

This application is a continuation-in-part of our co-pending application, Ser. No. 385,046, filed July 24, 1964, now abandoned.

This invention relates to foodstuffs and more particularly to the treatment of meat, including poultry and fish.

When meat is cooked, and for convenience, the term "cooked" is intended to include the reheating of cooked meat as well as cooking and partial cooking, a proportion of its fluid content is lost as "cooking loss," which has the effect of reducing not only the water content of the meat but also its content of minerals, vitamins, flavoring materials and fat, so that the final cooked product is neither so large nor so nutritious as the meat before cooking.

We have now discovered that impregnation of meat with organic hydrophilic material capable of binding the meat fluids reduces cooking loss.

Accordingly the present invention provides a process for the treatment of meat which is subsequently to be cooked, which comprises the step of impregnating the meat with an organic hydrophilic material capable of binding to itself fluids of the meat.

It is known in the art that the injection of post-mortem meat with water before rigor mortis sets in may tenderize the meat. However, such a process may be undesirable because it provides a "watery" meat product.

It is also known in the art (U.S. Patent No. 3,147,122) that "watery" meat may be improved by injection of water containing a small amount of hydrophilic colloid, such as sodium carboxymethyl cellulose or starch. "Watery" meat is a well recognized problem, particularly in pork, and is also caused by the expulsion of fluid during the muscular contractions of rigor mortis. The use of hydrophilic colloids at the low levels, such as 0.02%, found to be effective to prevent meat taking on the "watery" appearance would provide no effect on the loss of fluids from the meat during cooking.

Impregnation according to the invention is carried out while the meat is substantially intact. We have found that an improved comminuted meat product is obtained if the meat is impregnated according to the invention before comminution.

The organic hydrophilic material employed is preferably one capable of being distributed substantially uniformly throughout the meat, and the organic hydrophilic material should be incorporated in such a way that it retains its capacity to bind meat fluids.

Examples or organic hydrophilic materials which may be employed according to the invention are starches and modified starches, proteins, alginates, pectates, carrageenates, gums, modified cellulose and mixtures of these with each other and with suitable edible carriers or other materials such as flavors, vitamins, etc. Particularly suitable are substances which form gels or viscous solutions on heating.

The amount of hydrophilic material employed will usually depend on its water-binding capacity. Preferably the hydrophilic material is incorporated into the meat in an amount forming from 1% to 15% of the weight of the impregnated meat (that is, of the weight of the meat after impregnation and before it is subjected to any further treatment). For instance, a level of about 4% of cereal starch has been found to be very suitable. When root starches are employed as the hydrophilic material, the preferred amount of hydrophilic material incorporated into the meat is from 1 to 8% by weight.

When incorporated into the meat in an aqueous medium some of the above mentioned hydrophilic materials may require special treatment, such as encapsulation, to prevent them taking up water before they are incorporated into the meat, that is, so that they retain their water-binding capacity until they are in the meat. Dispersion in fat or oil is also an effective way of introducing relatively soluble materials such as gelatins into the meat. Other suitable methods may be employed, such as impregnation with material carried in a stream of gas. One way of impregnating the meat with a hydrophilic protein material is to prepare a solution or suspension of the protein and then, after impregnation, to heat the meat so that the protein gels and is able to bind more water.

Particularly satisfactory results have been obtained by the incorporation into meat of a suspension of starch grains which, on cooking, gelatinize and acquire the power to retain a high proportion of the meat fluids. Root starches, such as tapioca, farina and arrowroot are preferred, although cereal starch may also be used.

It is desirable that distribution of the organic hydrophilic material should be substantially uniform throughout the meat and the preferred method of incorporating the organic hydrophilic material into the meat is by injection using a suitable needle or syringe. Multiple injection apparatus employing a battery of perforate needles has been used with particular success.

Since the purpose of the hydrophilic material is to reduce fluid loss on cooking it is preferably incorporated into the meat before the meat is subjected to any cooking treatment. However, the meat may be subjected to a cooking treatment prior to impregnation, in which case cooking loss on subsequent reheating or cooking of the meat is reduced. When this latter procedure is followed, it has been found advantageous to use the fluid lost during the early cooking step to make up the solution or suspension of hydrophilic material for the impregnation of the meat. In this way, loss of valuable nutritional ingredients is reduced. After treatment according to the invention, the meat may, if desired, be cooked and then frozen, freeze-dried or canned; the presence in it of the hydrophilic material reduces cooking loss attendant upon any subsequent warming or cooking step, and also facilitates the rehydration of dehydrated meat products.

After treatment according to the invention, the meat may, if desired, be frozen or freeze-dried prior to cooking. In this way, a product having a long shelf life may be obtained which can be cooked just prior to consumption and which will enjoy the benefit of the invention.

The invention is illustrated by the following examples.

EXAMPLE 1

A topside of raw beef was divided into halves, one (A) to act as control, the other (B) being treated according to the invention.

B was uniformly injected with a mixture of 20 parts of raw starch and 80 parts of 3.5% cooked starch paste, giving a weight increase of 30% (corresponding to 6% uptake of raw starch). Both A and B were immersed in water at simmering temperature and cooked until the temperature at the center of each block reached 90° C.

Cooking loss (percent) was determined as follows:

Weight of uninjected raw meat—wt. of cooked meat×100 / Weight of uninjected raw meat The meat was sliced into slices 3 mm. thick and the slices packed, in gravy, in flexible plastic bags and frozen to −20° C. After storage at −20° C. for several days the contents of the bags were rewarmed for consumption, by heating for 10 minutes in boiling water. The change in weight of the slices during rewarming was noted and the overall cooking loss calculated.

The following results were obtained:

| Sample | Cooking losses | | Flavor | Texture |
|---|---|---|---|---|
| | Block | Rewarmed Slices | | |
| A (control) | 43.4 | 40.8 | Satisfactory. | Fairly satisfactory. |
| B (Starch injected). | 14.2 / [1] 20.2 | 14.9 / [1] 20.9 | ---do--- | Tender. |

[1] Corrected for raw starch content.

EXAMPLE 2

A topside of beef was divided into halves (C and D), one half (C) being the control, the other (D) being treated according to the invention. D was uniformly injected with a starch suspension having the following composition: 100 parts of a mixture of 7.5% soy protein/ 25% milled unrendered fat/67.5% water: 20 parts of raw starch. The increase in weight of the injected raw block was equivalent to the deposition in it of 2.9% of raw starch.

Both samples (C and D) were treated and tested as described in Example 1, the results obtained being as follows:

| Sample | Cooking losses | | Flavor | Texture |
|---|---|---|---|---|
| | Block | Rewarmed slices | | |
| Control (C) | 39.6 | 39.9 | Quite good | Tough. |
| Starch/fat/protein injected meat (D). | 20.8 / [1] 23.7 | 22.4 / [1] 25.3 | Satisfactory. | Satisfactory. |

[1] Corrected for raw starch content.

The use of the fat-protein homogenate as a suspension medium for the raw starch gave a white heat-stable gel in the cooked meat which gave the meat an attractive "fat-marbled" appearance.

EXAMPLE 3

Example 2 was repeated, except that the meat treated according to the invention was injected with a mixture of 100 parts of 7.5 soy protein/25% rendered beef-fat/ 67.5% water dispersion and 20 parts of raw starch. The injected meat after cooking had a typical roast-beef flavor.

EXAMPLE 4

Topside meat was divided into halves, and one-half was injected with a suspension of 20 parts raw starch and 80 parts of 5% cooked aqueous starch paste to a final raw starch content of 6%. The injected and uninjected halves were cut into pieces 20 mm. x 20 mm. x 12 mm., and cooked by simmering in seasoned and thickened gravy. The cooking time employed was the time required for the injection sample to become tender.

The cooked meats were held at 2° C. overnight, filled into pie cases, and rewarmed until the casing was cooked. The assessment of cooked meat quality was as follows:

Sample: Texture
Control _____ Rather tough.
Injected meat _____ Tender.

EXAMPLE 5

A topside of beef was divided into halves and one-half was injected uniformly with a starch suspension of 20 parts raw starch in 80 parts of a 5% aqueous suspension of cooked starch to a final raw starch content of 6%. The injected and uninjected blocks were tempered at −2° C., sliced into strips 3 mm. x 50 mm. x 20 mm. in dimension, and freeze-dried. The strips were rehydrated in a sauce as part of a dehydrated meal.

The starch injected meat was very noticeably more tender and succulent than the uninjected sample.

EXAMPLE 6

The process described in Example 5 was repeated except that both samples of meat were cooked before slicing and freeze-drying. Again, the meat treated according to the invention was found to be more tender and succulent than the untreated meat.

EXAMPLE 7

A topside of beef was divided into three equal portions, A, B and C. Portion A was reduced to sausage meat by comminution in a bowl chopper and rusk binder and minor flavoring ingredients added in the normal way. Portion B was reduced to sausage meat in a bowl chopper as before, but part of the rusk binder was replaced by its carbohydrate equivalent of uncooked corn starch, the starch being mixed in with the meat and rusk binder during comminution. Portion C was also reduced to sausage meat, and part of the rusk binder was replaced by its carbohydrate equivalent of uncooked corn starch, but the starch was incorporated by injection of a 20% suspension of raw starch in a 5% cooked starch paste into the meat, prior to its comminution.

The composition of the sausage meat mixes so obtained were as follows:

PERCENTAGE COMPOSITION

| Ingredients | A | B | C |
|---|---|---|---|
| Lean beef | 47.5 | 48.0 | [1] 64.0 |
| Fat | 20.4 | 20.6 | 20.6 |
| Water | 20.4 | 20.6 | 7.8 |
| Seasoning | 1.5 | 1.5 | 1.5 |
| Rusk | 10.2 | 5.7 | 5.7 |
| Corn flour added | | 3.7 | |

[1] 47.5% lean beef injected with 16.5% starch emulsion (3.5% starch, 13.0% water).

NOTE.—Slight variations in proportion of major ingredients is caused by adjustment of the mixes ot similar final hydrate content.

The sausage meat obtained as described above was made into sausages, and the cooking loss and texture of these sausages after cooking are summarized in the following table:

COOKING LOSS AND TEXTURE OF SAUSAGES

| Treatment | Percentage Cooking loss | Texture Score |
|---|---|---|
| A (control) | 24.8 | 6.5 |
| B (starch added) | 15.0 | 5.6 |
| C (starch injected) | 16.7 | 6.3 |

The sausage texture was assessed on a scale ranging from 1 (disliked extremely) to 9 (liked extremely).

The table shows that the use of starch as a partial replacement for normal rusk binder diminishes cooking loss, and that meat injected with starch prior to comminution can give sausages having a higher textural rating than sausages made by adding starch with the other ingredients to the chopped meat.

EXAMPLE 8

Beef topside was divided into two halves A and B. A, the control, was cooked without further treatment by immersion in boiling water. B was injected with a 5% suspension of raw tapioca starch in 5% tapioca paste, to a final raw starch content of 2% on the raw meat weight. Injected block B was cooked as A, both being cooked until their center temperatures reached 85° C. They were chilled overnight at 2° C., sliced and frozen in gravy in high density polythene bags.

The weight of the cooked block, and the slices before freezing and after rewarming the bag in boiling water, were recorded.

The following table shows the yield of rewarmed meat slices expressed as a percentage of the original weights of A and B.

Yield of rewarmed control and tapioca starch injected beef slices

Treatment: Yield of rewarmed slices
  A (control) _____ 51.5
  B (starch injected) _____ 55.1

We claim:

1. A process for treating substantially intact raw meat which is subsequently to be cooked which comprises injecting the meat with uncooked starch grains to form an impregnated meat, the starch being injected in an amount of from 1-15% by weight of the impregnated meat.

2. The process of claim 1, wherein the starch is injected into the meat in an amount by weight of from 1-8% of the weight of the impregnated meat.

3. The process of claim 1, wherein the meat after injection is subsequently comminuted.

4. The process of claim 1, wherein the starch is a root starch selected from the group consisting of tapioca, farina and arrowroot.

References Cited

UNITED STATES PATENTS

| | | | |
|---|---|---|---|
| 3,052,545 | 9/1962 | Ducharme et al. | 99—107 X |
| 3,147,122 | 9/1964 | Williams | 99—107 |
| 3,241,982 | 3/1966 | Shank | 99—208 |

A. LOUIS MONACELL, Primary Examiner

R. M. ELLIOTT, Assistant Examiner

U.S. Cl. X.R.

99—108